United States Patent [19]

Kolker

[11] 4,290,085

[45] Sep. 15, 1981

[54] SYNCHRONIZATION SYSTEM FOR VARIABLE LINE LENGTH FACSIMILE TRANSCEIVERS

[75] Inventor: Carl R. Kolker, San Gabriel, Calif.

[73] Assignee: Faxon Communications Corporation, Pasadena, Calif.

[21] Appl. No.: 150,092

[22] Filed: May 15, 1980

[51] Int. Cl.³ .............................................. H04N 1/36
[52] U.S. Cl. .................................... 358/264; 358/265
[58] Field of Search ................ 358/264, 265, 256, 257

[56] References Cited

U.S. PATENT DOCUMENTS

| | | | |
|---|---|---|---|
| 3,673,322 | 6/1972 | Baxter | 358/264 |
| 3,843,839 | 10/1974 | Campbell | 358/264 |
| 3,952,144 | 4/1976 | Kolker | 358/282 |
| 4,081,842 | 3/1978 | Harbaugh | 358/264 |
| 4,095,248 | 6/1978 | Kolker | 358/288 |

Primary Examiner—Howard Britton
Attorney, Agent, or Firm—Morganstern, Mann & Smith

[57] ABSTRACT

In a facsimile transceiver, an independent, high frequency precision oscillator precisely times the generation of synchronizing pulses which are transmitted to a remote, similar transceiver. An identical precision oscillator assures that the receiver employs the transmitted synchronizing pulse to generate an accurate representation of the information being transmitted. The precision oscillators generate much lower frequency clocking signals, which remain in synchronism during the transmission of a "page" of data.

14 Claims, 7 Drawing Figures

PRECISION CLOCK CIRCUIT

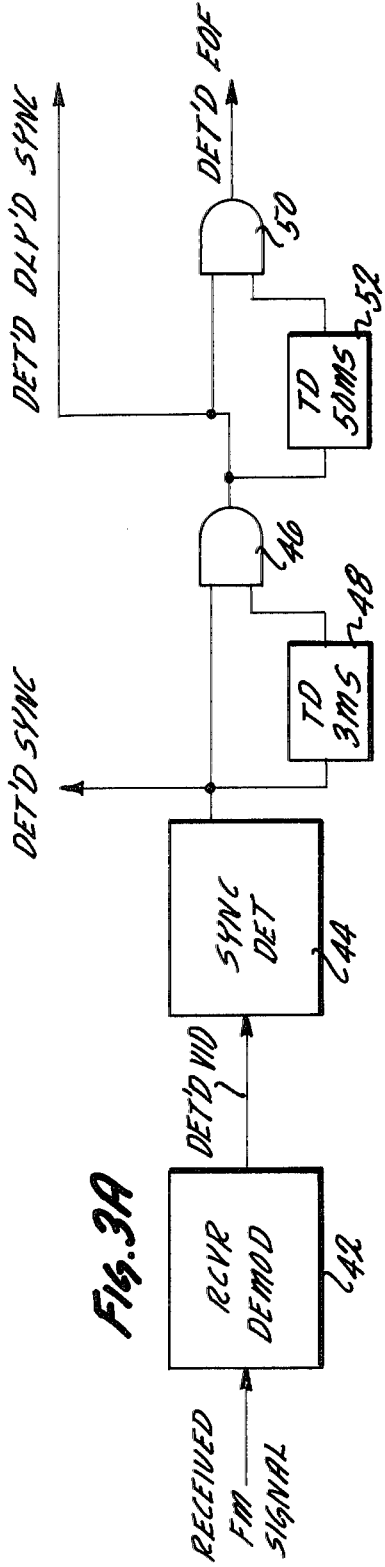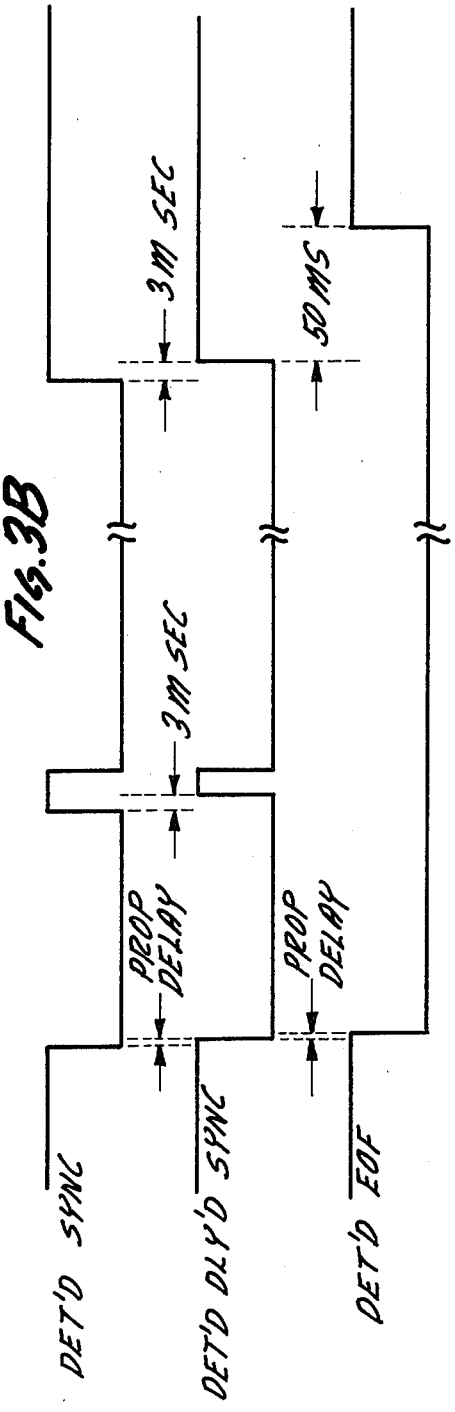

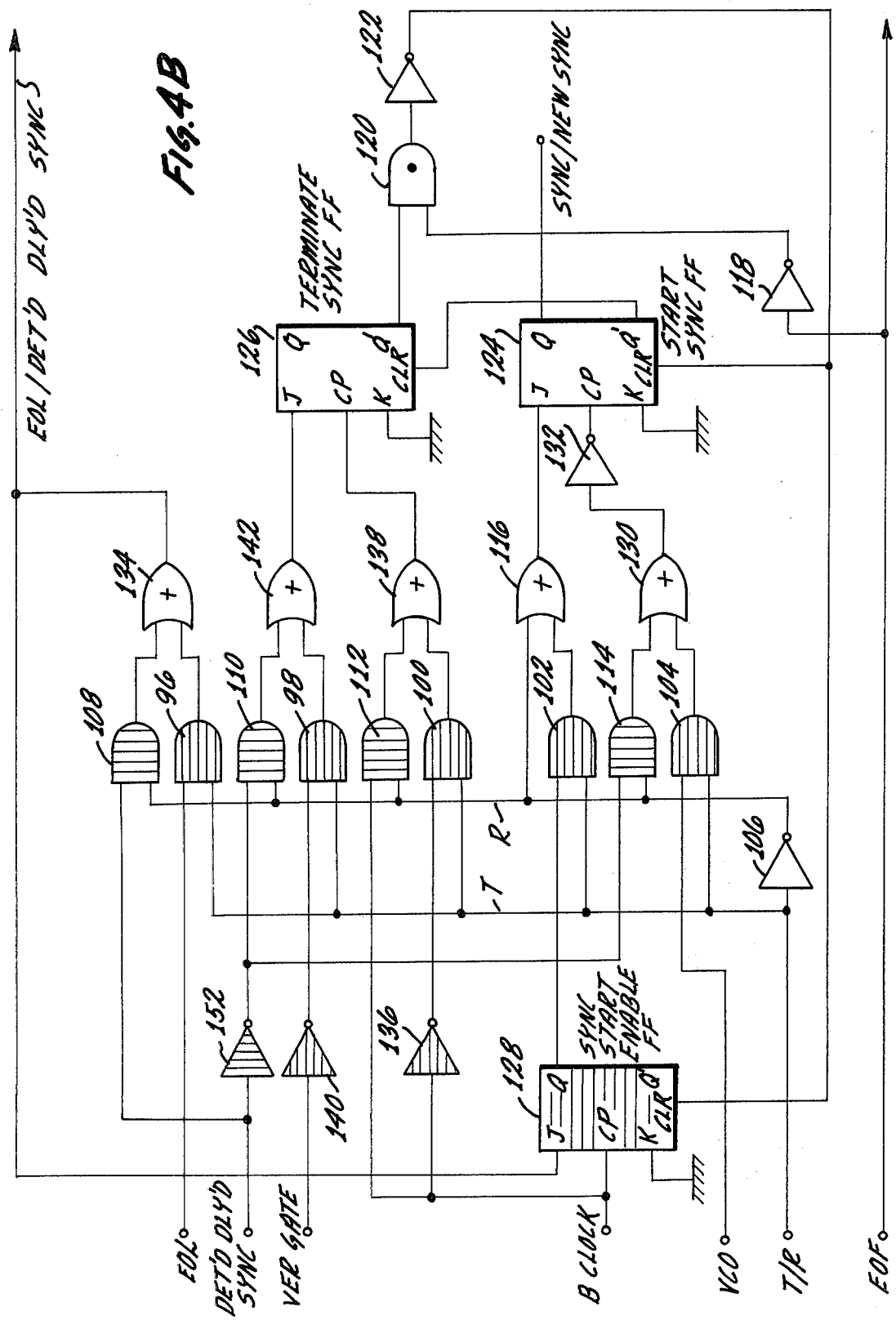

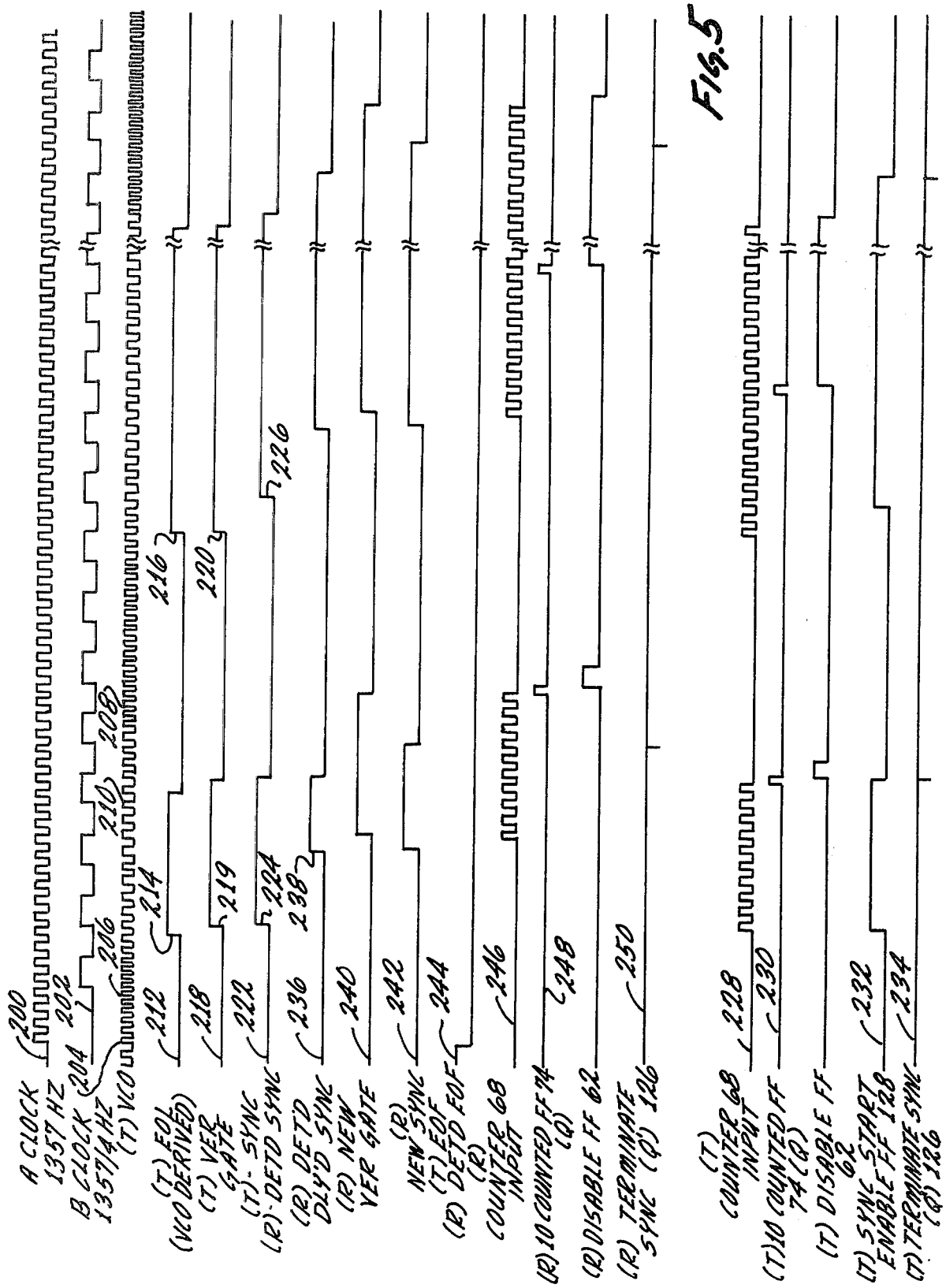

SYNCHRONIZATION SYSTEM FOR VARIABLE LINE LENGTH FACSIMILE TRANSCEIVERS

BACKGROUND OF THE INVENTION

1. Field of the Invention

The present invention relates to facsimile systems and more particularly to an improved synchronizing system that is relatively immune to timing errors that might be introduced by a "noisy" transmission link.

2. Related Prior Art

The present invention is intended to be an improvement of and modification to the Graphic Indicia Video Signal Acquisition Transmission and Reproduction System of U.S. Pat. No. 3,843,839, issued Oct. 22, 1974, to John Scott Campbell, et al., and assigned to the assignee of the present invention. A system for controlling brightness and contrast which is useful in the present system was disclosed in a patent to the applicant, U.S. Pat. No. 3,952,144, issued Apr. 20, 1976, and also assigned to the assignee of the present invention.

A system for speeding the data acquisition process, especially when dealing with documents that include non-informational areas, intended to function with the above-identified transmission and reproduction or "facsimile" system has been disclosed in a co-pending application of Kolker et al., Ser. No. 696,744, filed June 16, 1976, now U.S. Pat. No. 4,095,248, which has also been assigned to the assignee of the present invention.

Other prior art facsimile systems have been discussed in the above-identified references and the state of the art has been fairly well documented. It is the object of the present invention to provide an improvement to the systems heretofore disclosed, which tends to eliminate the problems caused by timing instability introduced by the transmission link between substantially identical transceivers.

In the prior systems, a transceiver functioning as a transmitter generated and transmitted an "End Of Frame" signal and a series of SYNC signals which modulated a carrier suitable for voice grade communication links such as telephone circuits. A substantially identical transceiver, functioning as a receiver utilized a synchronizing signal to operate a receiving device in substantial synchronism with the transmitter at the beginning of each line scan so that, except for the delay introduced by the communication link and which may be disregarded, the receiver "followed" the transmitter in the reproduction of the transmitted information.

Accordingly, the received End Of Frame signal reset and cleared all operating circuits in preparation for the start of a transmission and the received SYNC signal (which includes a pre-SYNC and post-SYNC portion) generated the necessary signals to increment the vertical deflection circuits and provide flyback and start-up of the horizontal sweep circuits. In order to maintain the transmitter and receiver in synchronism, the SYNC pulse which was transmitted was also utilized at the transmitter to accomplish the same functions for the transmitter that were accomplished at the receiver, such as control of duration of vertical step and timing of the beginning of the horizontal sweep.

The system is operable in a scan mode when transmitting information bearing segments of a document and in search modes when searching segments of the document to determine if they are information bearing or non-information bearing portions. The above-identified Kolker et al. application teaches a system which uses various modes to distinguish between information and non-information bearing portions of a document, and selects the scan speed and vertical step magnitude accordingly.

The SYNC signal in scan passes, search passes and combined scan-search passes continues to be produced and is transmitted at the end of each horizontal pass, to determine by its occurrence the start time or horizontal release time of the next pass and to control, by its duration, the vertical step magnitude between the present pass and the next pass. Since any pass can include either high and/or low speed portions, the duration of a given pass is not predictable and thus the time of arrival of the transmitted SYNC pulse cannot be anticipated. If phase instabilities, distortions, noise, etc. are introduced into the communication link resulting in timing errors, then any delay in recognizing and utilizing the transmitted SYNC signal would result in a line which may be displaced relative to its proper location. These errors, if occurring on successive lines, might result in blurred or illegible information, since vertical lines on the original copy would not necessarily be reproduced as strictly vertical lines.

Further, since a plurality of horizontal scans are required to build up a line of print, the individual characters may become distorted and possibly illegible. As noted, the duration of the SYNC signal is directly used to indicate the magnitude of the vertical increment that must be stepped to each next scan. Where the vertical distance between successive information areas is important, if the vertical registration of the copy does not correspond to that of the original, errors could result, especially if vertical dimensioning is important.

Since the transmission link between transceivers will generally be voice grade telephone lines, the effects of the path on the transmitted SYNC signal are significant. The path may introduce short noise pulses or transients whose onset can be misinterpreted as the initiation of the SYNC signals. The path may introduce delays or distortions which will tend to vary the duration time, thereby affecting the time occurrence of either or both the rising and falling edges of the SYNC signal. The cumulative effect on the SYNC pulse is to create uncertainties as to the exact time of initiation and termination as well as a "stretching" or "shrinking" of the actual duration time of the pulse. As a result, transmission link timing errors may occasionally result in poor quality documents being created by the receiver.

As may be noted from the Campbell et al. patent, the magnitude of vertical deflection or of the incremental vertical step between successive scans or passes is determined by the time duration of the SYNC pulse that is generated at the end of each pass to synchronize the start of a new pass. That capability was exploited in the co-pending application to Kolker et al., supra, and is also utilized in the present invention.

According to the present invention, a more precise synchronism is acheived between remote transceivers by the introduction into each transceiver of relatively high frequency, precision oscillators as internal references. When a transceiver is in its "sending" mode, its synchronization signal is under "control" of a precision oscillator. When a like transceiver is in its "receiving" mode, its synchronization is under the gross control of the transmitter and further under precise "control" of its own precision oscillator.

Each precision oscillator is counted down to provide a precisely timed clock which combines with various signals to produce SYNC signals and internal control signals that direct scanning circuits of the sending and receiving elements of the facsimile system.

In the preferred embodiment, the precisely timed clock signals are derived from a 5.21088 Mhz frequency oscillators and are placed into phase alignment at the beginning of a document transmission by a signal that is generated at the transmitter, thereby simultaneously resetting the frequency dividers in both the transmitter and the receiver to the same starting condition.

The combination of the low relative drift rate of the precision oscillators and the initial phase alignment maintain the transmitter and receiver in synchronism throughout the time required to transmit a document.

SUMMARY OF THE INVENTION

In a preferred embodiment of the present invention, a new, EOL (End-Of-Line) pulse fulfills one of the functions of the old SYNC pulse and has a first duration range representing a single line vertical increment, or a second duration range, longer than the first, which represents a three line vertical increment. The SYNC pulse, which is still employed, is not used to control the magnitude of the vertical step directly, but rather to select, by its duration range, either the one line or three line vertical increment by controlling the generation of the corresponding precise duration Vertical Line Spacing Control Signal (VER GATE pulse).

As in the earlier inventions, the transceiver needs no special information with respect to the horizontal scan speed since, during a high speed search operation, a "white" representing video signal is transmitted. During a high speed search pass of the transmitter, the receiver continues with its normal slow scan and therefore falls behind and out of synchronism with the transmitter scan. However, it makes no difference if the continuous, slow, horizontal scan of the receiver loses synchronism during a pass with respect to a high speed transmitter pass, since there is no transmitted information to be lost during search. The trace is returned by a synchronizing signal and is thus resynchronized at the beginning of the next pass.

In generating the various internal control signals which are utilized by both the sending station and the receiving station, a first clock signal is used in conjunction with a second clock signal. The second clock signal is derived from the first but at one-fourth the clock rate.

To minimize the production of transient errors in the transmission link, a SYNC signal, when created, is started by a zero crossing of the Voltage Controlled Oscillator (VCO) in the transmitter. The SYNC signal is transmitted as a frequency representing a "whiter than white" level.

An End Of Frame (EOF) signal, which precedes the transmission of data, is utilized to zero the clock counters and return all circuits to a starting condition. It will therefore be seen that even serious frequency instabilities in the precision oscillators will have no noticeable effect on the clock generators, since the counters are all resynchronized after each "page" of data has been scanned. Since a page scan usually requires less than six minutes in normal operation, this is much too short a time for the precision oscillators to develop any significant errors.

A clock system derived from a precision, high frequency oscillator is used to initiate and terminate control functions in the facsimile system. To assure synchronism, neither the transmitter nor the receiver uses an End Of Line (EOL) signal as a synchronizing signal directly. The transmitter uses EOL as a gross indication of the end of a horizontal sweep and the VER GATE pulse duration to be selected. Similarly, the receiver uses the DETECTED SYNC (DET'D SYNC) as a gross indicator.

All control functions of both the transmitter and receiver are initiated or terminated by reference to the EOL or SYNC related signals and the internal clock. The occurrence of SYNC is tested in the receiver by clock signals in a manner which detects and discards transmission line transients and noise which might otherwise be mistaken for the onset of a received and delayed SYNC signal. A precisely timed SYNC signal is produced in the transmitter when an EOL signal really occurs. The duration range of EOL is tested and a corresponding precise duration VER GATE signal is produced.

An internal counter is used, in the preferred embodiment, to count cycles of a clock rather than VCO cycles which are more subject to drift. A first circuit recognizes a ten-cycle sequence which is used to generate a Vertical Line Spacing Control Signal or VER GATE signal (at the transmitter) or NEW VER GATE signal (at the receiver) based on the shorter duration range EOL pulse at the transmitter or DET'D DLY'D SYNC pulse at the receiver. A second circuit recognizes a count of nineteen, which is only enabled by the continuing existence of the EOL or DET'D DLY'D SYNC pulse in its longer duration range after the count of ten. The control signals for the longer VER GATE or NEW VER GATE pulse are thus generated.

As will be explained in greater detail below, logic circuits combine to generate substantially the same control signals at both the transmitting and at the receiving stations. Clearly, it is important that both transmitter and receiver step the same vertical increment and that the horizontal sweeps start substantially in synchronism or at least with a consistent, repeatable, offset. The use of similar circuits and synchronized clock generators tends to maintain this synchronism in the creation of the critical signals of the information transmission process.

The novel features which are believed to be characteristic of the invention, both as to organization and method of operation, together with further objects and advantages thereof will be better understood from the following description considered in connection with the drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 3, including FIGS. 3A and 3B, is a diagram of a simple circuit to create the Detected Delayed SYNC (DET'D DLY'D SYNC) signal and the typical wave forms produced by the circuit;

FIG. 4, including FIGS. 4A and 4B, is a block diagram of the circuits which implement the clock synchronized logic of the present invention; and FIG. 5 is a timing diagram illustrating the interrelationship of timing waveforms utilized in the present invention.

Figure 1:
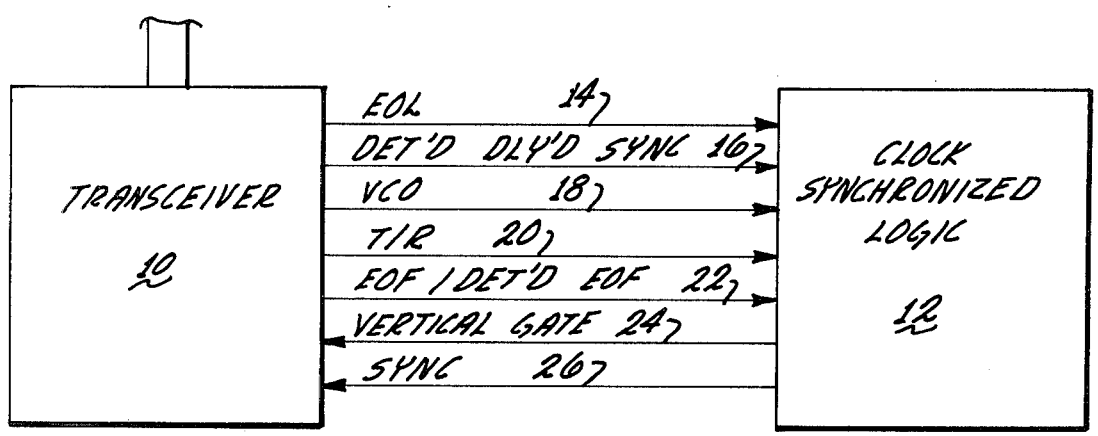
FIG. 1 is a block diagram of a facsimile transceiver incorporating the present invention.

In order to understand the operation of the present invention, it is necessary to discuss briefly the functioning of the facsimile system in which it is most useful. That system has been described in the patents and applications identified supra, which have been assigned to the assignee of the present invention.

In such a facsimile system, a target image, such as a book or a letter page or a photograph, is placed in a raster scanning beam so that the spot of light impinges on the target image following a pattern whereby the spot of light moves across the image page or photograph starting at top left and moving to the right. When the spot of light reaches the right edge of the image, it is returned to the left edge directly below the scan line just completed. The process is repeated, line-by-line, until the entire page has been scanned.

During the scanning process, as the spot of light traverses the image or characters on the page, a photoelectric transducer, which follows the scanning lines down the page, produces an electrical signal varying in amplitude in accordance with the light and dark areas of the target image traversed by the spot. The resulting varying electrical signal is employed to modulate a carrier of some sort for transmission to a remote location by wire or radio where a receiving device produces a scanning beam of light in synchronism with the transmitted line scan. The intensity of the light beam is varied so that the target image can be reproduced on a line-by-line basis by exposing a suitable light sensitive medium to the varying light beam.

If each scanning line has a fixed period (horizontal time) with equally incremented vertical steps between them (vertical gating time), then if one simultaneously started a clock in both the transmitting and remote receiving device upon initiating a transmission, the remote receiving device could simply and accurately anticipate the beginning (or ending) of each scanning line, providing excellent timing synchronization, even under rather severe transmission line vagaries. However, such a system requires the same transmission time for a full page of text or a picture as for a page containing only a single line of information.

A horizontal and vertical redundancy reduction technique was developed to reduce document transmission times. In such a system a target image, such as a book or a letter page or a photograph, is placed in a raster scanning beam so that a spot of light impinges on the target image following a predetermined pattern, whereby the spot of light moves across the image page or photograph starting at top left and moving to the right. As the spot of light reaches the right-most information (i.e., last bit of information) it continues on to the right edge of the copy, but at a much faster rate, and is returned to the left edge directly below the scan line just completed.

The information bearing portion of the line is scanned at a first linear rate that will comply with certain system resolution and transmission medium limitations. A proposed non-information portion of the line is searched at a second, faster linear rate, dictated by system mechanization, thereby causing a saving in transmission time. The process is repeated line-by-line until an entire "data block" has been scanned with each scanning line now random in period (horizontal time) but with equally incremented vertical steps (vertical gating time).

Upon vertically leaving a "data block," i.e., entering and searching a proposed page-width non-data area, the SYNC pulse period between scanning lines is increased by some factor, say three (3), tripling the spacing between line scans, while the scanning line speed is maintained at the faster search speed linear rate, thereby making additional savings in transmission time. A scanning pattern (Wide Search) is utilized which enables searching each three (3) line area in a single pass.

The process is repeated, pass-by-pass, until the complete page-width non-data area has been searched, i.e., until new data has been detected indicating a new "data block." The system alternately continues to advance through "data-blocks" and pagewidth non-data areas until the entire page has been scanned.

The remote receiving device now must rely upon a SYNC signal to establish spacing between line scans, and the time at which each following line scan begins. Because the line scan period can be of a random value, it follows that the SYNC signal at the remote receiving device cannot be anticipated, hence the need for a more sophisticated timing synchronization means.

Brief consideration must also be given to the nature of the received carrier signal and its relationship to the transmission medium characteristics and the detection means.

The received carrier signal is comprised of video and SYNC information in the form of varying electrical signals that are ideally distortion free. Because of the transmission medium characteristics, distortion does occur affecting phase, amplitude, and duration of SYNC and also line noise may occur which may be mistaken for the onset of SYNC or may further distort the actual SYNC pulse.

The present invention provides a method and means by which noise and distortion errors in SYNC information received via a data link can be eliminated by testing the received SYNC signal and generating corresponding, precisely timed resynchronized control signals. More precisely, the scanning beams in the transmitting and receiving devices are started in synchronism with the end of a SYNC signal, by precisely timed SYNC pulses, eliminating "SYNC jitter" that otherwise would occur because of false detection of transients. Further, errors in vertical registration generally caused by poor-grade, high-noise transmission media are also eliminated by testing the duration range of DET'D DLY'D SYNC and generating a corresponding, precise duration, Vertical Gate pulse.

As noted above, the sending device requires a signal indicating the end of the line scan (EOL), a Vertical Gate signal to advance the scanning beam by a proper increment in the vertical direction, and a SYNC signal which resets the sweep circuits in preparation for a new line scan.

These signals are required in both the sending and the receiving set and should be substantially simultaneous to assure that the copy is a faithful reproduction of the original. A predetermined offset of the signals will not affect the fidelity of the copy and therefore is acceptable, especially if the offset eliminates ambiguities with respect to the exact time of receipt of the transmitted signal.

The facsimile unit as disclosed either in Campbell et al., Kolker et al. or applicant's prior application, all require control signals. Rather uniformly, a signal known as "End Of Frame" (EOF) is used to signal the end of a frame or document and functions as a system reset or clearing signal. For example, in the prior art systems, EOF was used to zero both the horizontal and vertical deflection circuits.

A "mode" signal was provided to indicate whether a particular transceiver was operating as a transmitter or a receiver in any given application. Since a universal transceiver is most useful, a particular set requires some signal to disable those circuits that are not required in the particular application, whether it be transmit or receive. In the present embodiment, a T/R signal is used which is at a first level for a transmitter and at a second level for a receiver.

In the transceivers heretofore described, while operating as a transmitter, a signal at the end of each line scan was called "SYNC," sometimes "EOL." This signal operated blanking circuits, reset the horizontal deflection circuits, incremented the vertical deflection circuits and modulated the Voltage Controlled Oscillator (VCO).

In the present embodiment, this signal is called EOL, serving to indicate end of line, from which two separate signals are extracted, SYNC and VER GATE. SYNC now operates blanking circuits, resets the horizontal deflection circuits and modulates the Voltage Controlled Oscillator (VCO), while VER GATE increments the vertical deflection circuits.

When operating as a receiver, "SYNC" was demodulated and was called "DET'D SYNC." Another signal called "DET'D DLY'D SYNC" was derived from "DET'D SYNC." "DET'D SYNC" served to provide vertical deflection control of the receiving device by its duration, while "DET'D DLY'D SYNC" was used to reset the horizontal deflection circuits.

In the present embodiment, the names DET'D SYNC and DET'D DLY'D SYNC are retained, where DET'D SYNC is used only to derive DET'D DLY'D SYNC and where DET'D DLY'D SYNC is the signal from which two separate signals are again extracted, now called NEW SYNC and NEW VER GATE respectively. NEW SYNC now operates the receiving device blanking circuits and resets the horizontal deflection circuits, while NEW VER GATE increments the vertical deflection circuits and also provides additional CRT blanking.

Functionally, the transmitter starts with an EOF signal which clears all circuits and, in the absence of which, a data transmission can begin. A line scan is commenced and video information corresponding to the portion of the document scanned by the flying spot scanner modulates a carrier signal and is transmitted to a remote receiver. At the end of a line, a SYNC signal including a pre-SYNC and post-SYNC are generated, only one of which, SYNC, need be considered.

DESCRIPTION OF THE PREFERRED EMBODIMENT

Turning first to FIG. 1, there is indicated in block form a transceiver 10 which includes the cathode ray tube and control circuits therefor which have been disclosed in the patent and applications assigned to the present assignee. One skilled in the art can readily employ the control signals discussed hereinbelow to operate such a facsimile transmitter or receiver in accordance with the present invention. Some of the control signals therein have clear counterparts in the present invention although the terminology may vary.

A Clock Synchronized Logic circuits block 12 is also indicated in block form and includes those new elements which, according to the present invention, generate the appropriate control signals for operation of the transceiver 10, whether functioning in a transmit mode or a receive mode. In the earlier described systems, the key signal was the "SYNC" signal which was generated in the transmitter and sent through the communication link to a remote receiver. In the present embodiment, the key signal remains the "SYNC" or "EOL" signal. However, the creation, duration and termination of the transmitted SYNC signal is now established by reference, ultimately, to a high frequency, precision oscillator which is provided at each transceiver 10.

As shown in FIG. 1, the transceiver creates an EOL signal on line 14 when operating as a transmitter or a Detected Delayed SYNC (DET'D DLY'D SYNC) signal on line 16 when operating as a receiver. Further, the Voltage Controlled Oscillator (VCO), which is modulated with information applies a square wave signal on line 18.

A T/R signal is applied on line 20 which indicates the operating mode of the transceiver 10. An End Of Frame (EOF) signal is applied on line 22 and functions to clear and reset the logic circuits. The EOF signal may be automatically generated at the end of a document scan, from a manually operable, start/stop switch, or can be received from a remote transceiver functioning as a transmitter to indicate the end of a document or the start of a transmission.

The Clock Synchronized Logic circuits 12 generate two precisely synchronized control signals independent of the operating mode of the transceiver 10. A first signal is a Vertical Gate signal on line 24, called VER GATE when operating as a transmitter, NEW VER GATE when operating as a receiver, which, by its duration, controls the vertical deflection circuits to step the vertical displacement of the scan line by one or more increments. A second command is a synchronizing signal, on line 26, called SYNC when operating as a transmitter, NEW SYNC when operating as a receiver, which zeroes the horizontal deflection circuits and, when terminated, permits horizontal scanning to resume.

In the preferred embodiment of the invention, a Voltage Controlled Oscillator (VCO) is modulated with information derived from the scanned image. The black representing signal is approximately 2400 Hz, a white representing signal is approximately 1800 Hz and the SYNC signal frequency is approximately 1357 Hz. All VCO derived signals are independent of and not in synchronism with the clocks, which are based on a high frequency, precision oscillator.

The transmitter EOL pulse (VCO based), is initiated and terminated with reference to the zero crossings of the VCO. At the end of a scan line, a negative going zero crossover of the VCO starts the EOL signal and, depending upon whether information or non-information areas are being scanned, either 5.5 cycles later or 16.5 cycles later the EOL signal is terminated at the positive going zero crossover of the VCO.

The Detected Delayed Sync (DET'D DLY'D SYNC) signal is created at the receiver detection circuits and is derived from the transmitted SYNC signal. To provide a certain amount of noise immunity, a delay is interposed. The DET'D DLY'D SYNC signal is therefore abbreviated by that delay, since the signal terminates simultaneously with the end of the Detected Sync (DET'D SYNC) signal.

The VER GATE signal in the transmitter, starts with the first fall of the internal A CLOCK following the beginning of a transmitter EOL signal and ends with a rise of the internal A CLOCK either 9.5 clock cycles later if (for example), in scan mode or 28.5 A CLOCK cycles later if in a page-width non-data area in a rapid search mode. Both transmitter and receiver Vertical Gate Signals follow the same rules, except the receiver NEW VER GATE signal is initated by the first fall of the internal A CLOCK following the beginning of DET'D DLY'D SYNC and either 9.5 or 28.5 A CLOCK cycles later, and terminates on the rise of the internal A CLOCK.

The SYNC signal in the transmitter is a square wave whose duration depends upon whether data or non-data areas are being scanned. This pulse starts on the first negative going zero crossing of the transmitter VCO after the first rise of the internal, quarter clock signal following the beginning of a transmitter EOL pulse. The pulse terminates on the first fall of the internal quarter clock following the termination of the transmitter VER GATE pulse.

The receiver NEW SYNC signal starts with the beginning of DET'D DLY'D SYNC and ends on the first rise of the internal quarter clock following the termination of the DET'D DLY'D SYNC signal. The receiver NEW SYNC signal is later than the Transmitter SYNC signal by ½ cycle of the internal quarter clock signal.

It will be noted that the receiver NEW SYNC signal ends slightly before the NEW VER GATE signal has terminated, allowing the receiver horizontal sweep to start while the receiver CRT is yet blanked. This may result in a minor printing loss of data at the receiver of the very left-most edge of a scanned document at the transmitter. A slight left margin "over-scan" of a white (non-data) area may be used at the transmitter if reliance on anticipated lack of information (data) in the left hand margin of documents being scanned cannot be tolerated.

To summarize the foregoing and to provide concise definitions of each of the control signals, the following table is provided:

TABLE I

CLOCK SYNCHRONIZED LOGIC SIGNAL DEFINITIONS

Transmitter Related Signals:

| | |
|---|---|
| VCO | Transmitter Voltage Controlled Oscillator |
| A | A Clock = 1357 Hz = 5.21088 MHz/3840 |
| B | B Clock = A/4 = 339.25 Hz = Quarter Clock |
| EOL | Transmitter End of Line, VCO derived<br>Start: $VCO_{fall}$ at end of horizontal sweep<br>End: 5.50 VCO cycles . scan + 16.5 VCO cycles . search |
| VER GATE | Vertical Line Spacing Control Signal<br>Start: EOL . $A_{fall}$<br>End: 9.5 A cycles later + 28.5 A cycles later |
| SYNC | Synchronizing Signal - Horizontal flyback, sweep release, modulates VCO, and blanks CRT<br>Start: $VCO_{fall}$ . $B_{rise}$ . EOL<br>End: VER GATE (end) . $B_{fall}$ |

Receiver Related Signals:

| | |
|---|---|
| A | A Clock = 1357 Hz = 5.21088 MHz/3840 |
| B | B Clock = A/4 = 339.25 Hz = Quarter Clock |
| DET'D SYNC | Detected Sync (Demodulated SYNC Signal) |
| DET'D DLY'D SYNC | Detected Delayed SYNC<br>DET'D DLY'D SYNC = DET'D SYNC . (DET'D SYNC delayed 3 msec), (starts 3 msec after DET'D SYNC, ends at end of DET'D SYNC) |
| NEW VER GATE | Regenerated Line Spacing Control Signal<br>Start: DET'D DLY'D SYNC . $A_{fall}$<br>End: 9.5 A cycles later + 28.5 A cycles later |
| NEW SYNC | Regenerated Synchronizing Signal<br>Start: DET'D DLY'D SYNC<br>End: DET'D DLY'D SYNC (end) . $B_{rise}$ |

NOTE:
+ is symbol for "OR"
. is the symbol for "AND"

Throughout the following description of a preferred embodiment of Clocked Sync Logic circuitry, the following terms will be used:

High—Refers to a high voltage logic level (typically +5.0 v in a system utilizing TTL logic) at the input or output of logic device (gate, flip flop, etc.) representing a "true" or enabled condition.

Low—Refers to a low voltage logic level (typically 0. v in a system utilizing TTL logic) at the input or output of a logic device (gate, flip flop, etc.) representing a "false" or disabled condition.

Momentary—Refers to a logic voltage level at the input or output of a logic device (gate, flip flop, etc.) which makes a transition from a high to a low or from a low to a high and then is quickly returned to its original state by circuit action. The time that the signal is in its high or low transitional state is measured in propagation delays of the logic devices that return it to its original state.

A preferred circuit embodiment is illustrated in FIG. 4. Inputs to the circuitry include A CLOCK, B CLOCK, DET'D DLY'D SYNC, and DET'D EOF, the generation of which is illustrated in FIGS. 2 and 3 and will be described prior to the description of FIG. 4.

Figure 2:
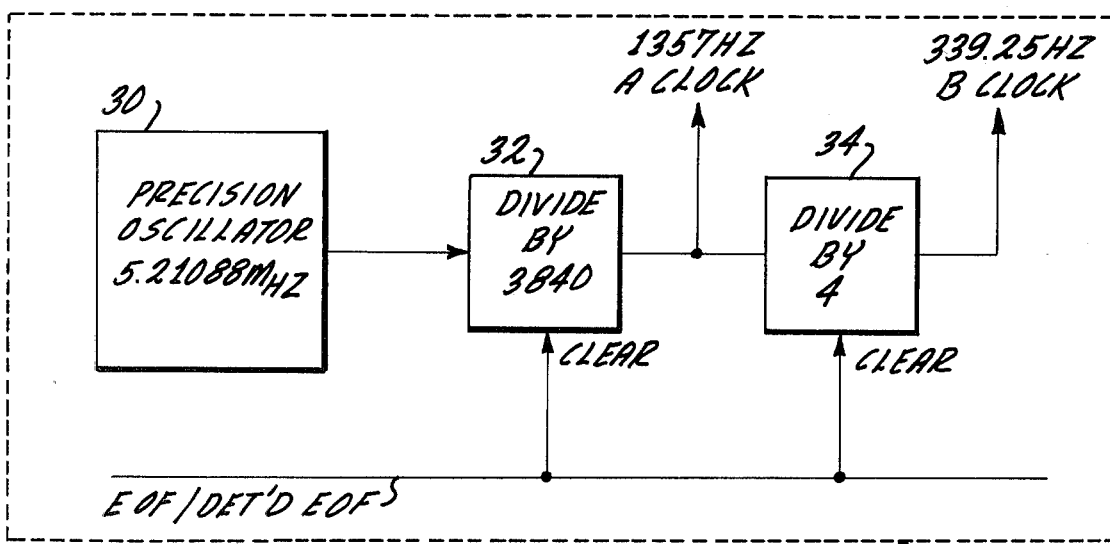
FIG. 2 is a diagram of an exemplary clock generator suitable for use in the present invention.

Turning then to FIG. 2, there is shown a Precision Clock Circuit 28 which generates A CLOCK and a quarter clock, B CLOCK, by frequency dividing a higher frequency precision oscillator 30 which is operating at 5.21088 MHz. The frequency dividing means are combinations of flip flops interconnected in such a manner as to produce the desired division ratios. Such combinations are well known and can be implemented by those skilled in the art.

The output of precision oscillator 30 is applied to a divide by 3840 circuit 32, the output of which is the A CLOCK, and is at a frequency of 1357 Hz and is applied to a divide by 4 circuit 34. Its output is the B CLOCK (also referred to as the quarter clock) and is a frequency of 339.25 Hz.

The EOF (End of Frame) line is connected to the "clear" input of each of the divider circuits 32, 34. When the EOF line is high, the dividers are reset and held inhibited from counting, and all the outputs are forced to a low. When the EOF line is low, the dividers are enabled, and the A CLOCK and B CLOCK will "run."

It can be seen that the B CLOCK is a precise sub-multiple of the A CLOCK, at exactly one-quarter the frequency. It is obvious to those skilled in the art that a precise phase relationship exists between the A CLOCK and B CLOCK.

To cause synchronization to occur between two transceivers, one operating as a transmitter and the other as a receiver, two Precision Clock Circuits 28 are employed, one at the transmitter and one at the receiver. The timing of the synchronizing signals at the transmitter is under the control of one Precision Clock Circuit 28, and the timing of synchronizing signals at the receiver is under the control of a second Precision Clock Circuit 28. At the beginning of a transmission, the divider circuits of the receiver are started simultaneously with the divider circuits of the transmitter (except for the delay of the transmission medium) by a frame start signal, initiated at the transmitter with a high to low transition of the EOF line and transmitted via the transmission medium.

It can be seen, therefore, that the A CLOCK and B CLOCK of both the transmitter and receiver will be precisely phased with one another (except for the delay of the transmission medium) to within one oscillator cycle of the 5.21088 MHz clock Precision Oscillator 30, which represents a maximum phasing error of less than 0.01% of the B CLOCK. The Precision Oscillator 30 has a frequency stability such that any shift in frequency which might occur during the time required to transmit a document will cause an insignificant phase shift to occur between the B CLOCK of the transmitter and the B CLOCK of the receiver.

It will be understood that the means in FIG. 2 are illustrative only. It is wholly within the scope of the invention to utilize any high-frequency, precision oscillator in each transceiver as the fundamental reference and to use any much lower frequency clock signal, which is periodically reset and utilized as the synchronizing signal, to maintain the transmitter and receiver in synchronism during transmission of video information representing the contents of a document.

Turning next to FIG. 3A, there is illustrated an extremely simple mechanization of circuitry which is contained within the transceiver 10 of FIG. 1 which can provide the DET'D DLY'D SYNC (Detected Delayed Sync) signal and the DET'D EOF (Detected End Of Frame) signal when the transceiver 10 is in the receive mode.

A received FM signal is applied to the RCVR DEMOD (Receiver Demodulator) circuit 42 which demodulates the signal and produces as an output, a DET'D VID (Detected Video) signal. The DET'D VID signal is applied to the SYNC DET (Synchronization Detector) circuit 44 which detects the presence of synchronization signals contained within the DET'D VID signal.

The output of the SYNC DET circuit 44 is the DET'D SYNC (Detected Synchronization) signal, and it is applied to one input of an "AND" gate 46 and, through a time delay TD 3 ms circuit 48 which delays the signal by 3 ms, to the other input of AND gate 46. When the DET'D SYNC line goes from high to low, the output of AND gate 46, which is the DET'D DLY'D SYNC signal, will go low immediately (except for the propagation delay of AND gate 46). However, when the DET'D SYNC line goes from low to high, which is usually the indication of the presence of synchronizing information, the output of AND gate 46 will be delayed 3 milliseconds before it goes from low to high.

The output of AND gate 46 is applied to one input of a second AND gate 50 and, through a 50 millisecond Time Delay Circuit TD 50 ms circuit 52, to the other input of AND gate 50. When the DET'D DLY'D SYNC line goes from high to low, the output of AND gate 50, which is the DET'D EOF signal, will go low immediately (except for the propagation delay of AND gate 50). However, when the DET'D DLY'D SYNC line goes from low to high, the output of AND gate 50 will be delayed 50 milliseconds by the action of TD 50 ms circuit 52, before it goes high.

The waveforms of FIG. 3B will serve to further illustrate the operation of the circuitry. During an end-of-frame condition, the received signal is such that the DET'D VID signal causes the SYNC DET circuit 44 to produce a high DET'D SYNC signal output. This signal in turn causes the DET'D DLY'D SYNC and the DET'D EOF signals to be high. When a transmission begins, the DET'D VID signal causes the DET'D SYNC signal to go low which causes the DET'D DLY'D SYNC signal to go low immediately (except for the propagation delay of AND gate 46). The DET'D DLY'D SYNC signal in turn causes the DET'D EOF signal to go low immediately (except for the propagation delay of AND gate 50). The high-to-low transition of the DET'D EOF line is the signal to the receiver that a transmission has begun.

At the end of each line scan of the transmitter, a synchronization signal is transmitted to the receiver, indicating that the end of a line has been reached, and the pulse width of the synchronization signal is an indication as to whether the transmitter is in page-width, non-data, high-speed search mode, long duration pulse, or in a slow-scanning, data-transmitting mode, short duration pulse. When received at the receiver, this information, which is present in the DET'D VID signal, causes the SYNC DET circuit 44 to produce a DET'D SYNC signal which will go high for the duration of the transmitted synchronization pulse width. The output of AND gate 46 will go to a high 3 milliseconds after any such DET'D SYNC pulses occur and will go low immediately upon the termination of such pulses (except for the propagation delay of the second AND gate 50). The 3 millisecond delay adds a degree of noise immunity to the system, preventing spurious noise pulses from generating false DET'D DLY'D SYNC pulses. The output of second AND gate 50 is not affected by DET'D DLY'D SYNC pulses that are shorter in duration than 50 milliseconds. Therefore, the DET'D EOF line will go high only at the end of a full-page transmission, which indicates to the receiver that a transmission is complete.

In FIG. 5 a series of waveforms illustrate the timing of the input, output, and internal signals of the circuitry of FIG. 4. These waveforms will not be specifically referred to during the following circuit description; however, they are included to assist in the understanding of the functioning of the logic circuitry. Reference should be made to these waveforms from time to time as the various signal paths are traced.

Figure 4A:
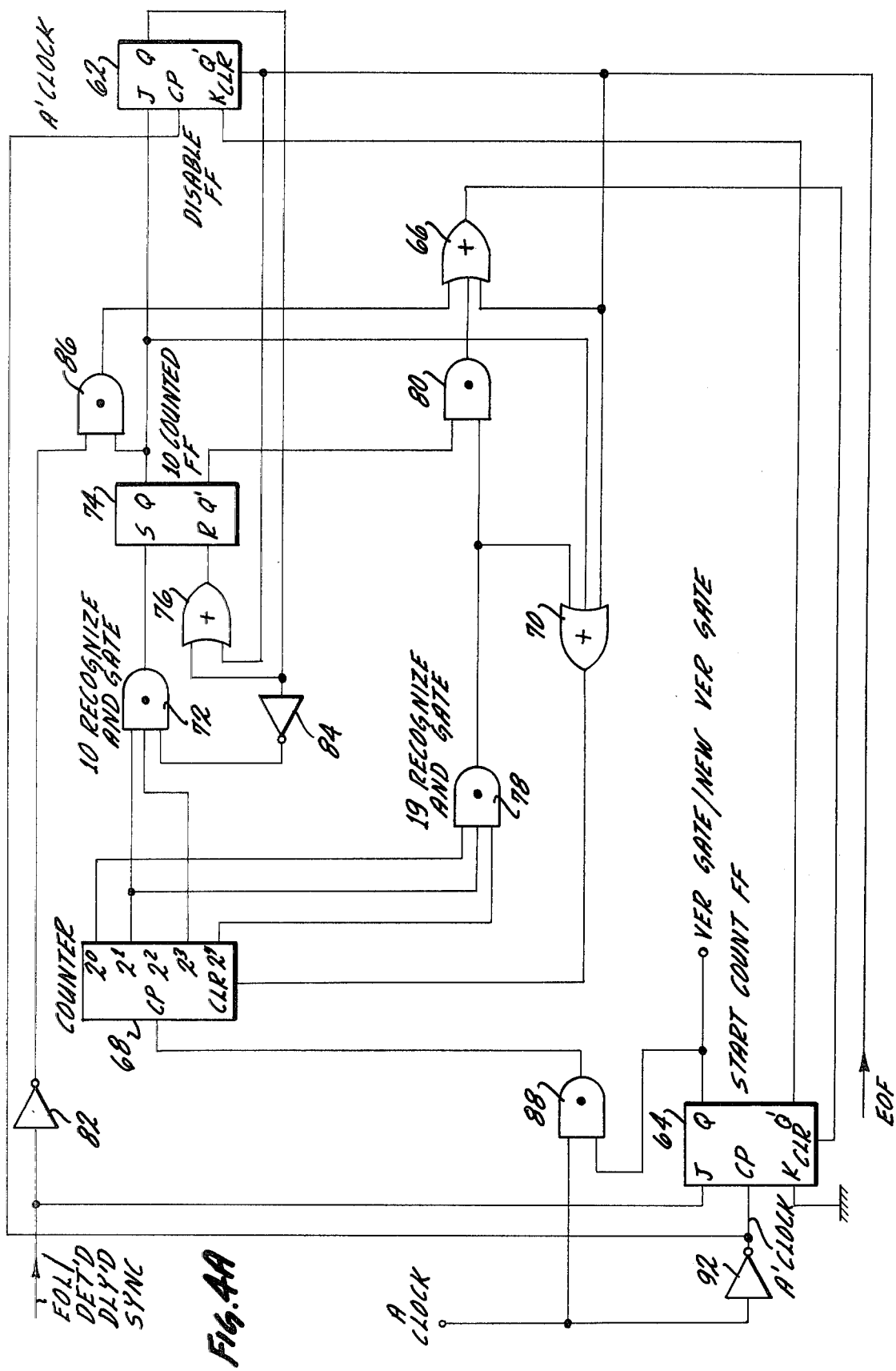

Given the rules by which the various signals are commenced and terminated, as described in Table I and illustrated in FIG. 5, those skilled in the art of circuit design can implement many alternative mechanizations. FIG. 4, including FIGS. 4A and 4B, is a circuit diagram illustrating a mechanization of a preferred embodiment of a transceiver, Clock Synchronized Logic Circuit 12 from FIG. 1.

In FIG. 4B, since the circuit illustrated is intended to be used as a transmitter or a receiver, those elements that are utilized only in the transmitter function have been given a horizontal shading (which is not intended to designate color), while the elements used in the receiver function have been given a vertical shading.

To begin a description of the Clock Synchronized Logic Circuits 12, initially it will be assumed that the system functions as a part of a transmitter. The discussion will trace the development of the vertical line spacing control signal, VER GATE, and the synchronizing signal, SYNC, best described with reference to FIG. 4A.

To establish that the device is in the transmit mode, a T/R signal is applied. If high, T/R signals the "transmit" mode, and if low, signals the "receive" mode.

Just prior to beginning a frame, the End Of Frame (EOF) line is high, the EOL line is low, and as heretofore described, the A CLOCK is not running, yielding a low A CLOCK line. The EOF line applies a high signal to the "clear" input of a DISABLE flip flop 62, to the "clear" input of a START COUNT flip flop 64 through an "OR" gate 66, and to the "clear" input of a COUNTER 68 through an "OR" gate 70, causing all to be reset; (i.e., DISABLE flip flop 62 Q output is reset to a low, START COUNT flip flip 64 Q output is reset to a low, Q' to a high, and COUNTER 68 output lines $2^0$ through $2^4$ are reset to a low).

Since the clearing action on COUNTER 68 causes all of its outputs to be low, the output of a 10 RECOGNIZE AND gate 72 will be low, applying a low to the "set" input of a 10 COUNTED flip flop 74. The EOF line applies a high to one input of an "OR" gate 76 causing "OR" gate 76 output to apply a high to the "reset" input of the 10 COUNTED flip flop 74. The result of the input conditions on the 10 COUNTED flip flop 74 will be to reset it; its Q output will be low, its Q' output, high.

Other circuit conditions that exist prior to the start of a frame are as follows: the output of a 19 RECOGNIZE "AND" gate 78 is low, the output of an "AND" gate 80 is low, the output of a first INVERTER 82 is high, the output of a second INVERTER 84 is high, and the output of an "AND" gate 86 is low, and the output of an "AND" gate 88 is low.

The EOL signal is a pulse that can be of different time durations determined by circuitry described in the referenced patents. In the event that the transceiver 10 is operating in a scanning mode as signaled by an EOL pulse of short duration, it is a command to the Clock Synchronized Logic Block 12, FIG. 1, to generate a VER GATE pulse which is 9.5 A CLOCK cycles in duration. If it is of a longer duration, it is a command to generate a VER GATE pulse which is 28.5 A CLOCK cycles in duration.

The response of the circuit will now be traced in response to the start of a frame, or transmission, and a short duration EOL pulse. As heretofore described, when the EOF line goes low to begin a frame, simultaneously the A CLOCK and the B CLOCK begin. The EOF line removes the resetting signal from DISABLE flip flop 62 and, since all other inputs to "OR" gate 66 and "OR" gate 70 are low, also removes the resetting signals from COUNTER 68 and START COUNT flip flop 64. The low EOF line also causes the output of an "OR" gate 76 to go low, and thus removes the resetting signal from 10 COUNTED flip flop 74.

A CLOCK pulses are being applied to an INVERTER 92 which produces at its output A' CLOCK pulses which are in turn applied to START COUNT flip flop 64 and DISABLE flip flop 62. However, due to low signals being applied to both the J and K inputs of START COUNT flip flop 64, it does not respond to these pulses. A low is being applied to the J input of DISABLE flip flop 62 and a high is being applied to its K input, and since the EOF signal has previously reset the Q output to a low, the DISABLE flip flop 62 will not respond to the A' CLOCK signals. A CLOCK pulses are also applied to one input of "AND" gate 88, but since its other input is low, its output is inhibited.

At the end of a line scan, EOL goes high, thus applying an enabling signal to the J input of START COUNT flip flop 64 and, through INVERTER 82, applies a low to one input of "AND" gate 86, disabling its output. On the next positive transition of the A' CLOCK, the Q output of the START COUNT flip flop 64 is set to a high, Q' to a low, thus VER GATE begins. "AND" gate 88 is enabled, A CLOCK pulses are applied to COUNTER 68, and since COUNTER 68 responds to positive transitions of the A CLOCK, it starts counting one-half A CLOCK cycle after the beginning of a VER GATE signal.

Being of short duration, the EOL pulse goes low before 9.5 A CLOCK cycles have occurred and, through INVERTER 82, applies a high to one input of "AND" gate 86, enabling it. When nine complete A CLOCK cycles have been received at COUNTER 68, the output of 10 Recognize "AND" gate 72 goes to a momentary high, setting the 10 COUNTED flip flop 74 Q output high, Q' output low, thus forcing "AND" gate 86 output high, and through "OR" gate 66 resets START COUNT flip flop 64 resulting in a Q output low, and a Q' output high, thus terminating the VER GATE signal.

The Q output of 10 COUNTED flip flop 74 also applies a high to one input of "OR" gate 70 clearing all outputs of COUNTER 68 to a low level. The Q output of 10 COUNTED flip flop 74 also applies a high to the J input of DISABLE flip flop 62, thereby enabling it to be set on the next positive transition of the A' CLOCK. Upon being thus set, with Q high, Q' low, the Q output of the DISABLE flip flop 62 applies a high to one input of "OR" gate 76, which in turn applies a high to the reset input of 10 COUNTED flip flop 74.

The output of the 10 RECOGNIZE "AND" gate 72 applies a low to the set input of 10 COUNTED flip flop 74. The output of the 10 Recognize "AND" gate 72 is low because of the low state of the outputs of COUNTER 68 and further because the output of an INVERTER 84 is low, thus applying a low to the set input of the 10 COUNTED flip flop 74. The 10 COUNTED flip flop 74 is therefore reset, with the Q output low and the Q' output high.

The Q output is applied to the J input of DISABLE flip flop 62. Since the K input of DISABLE flip flop 62 is returned to a high (inasmuch as the START COUNT flip flop 64 Q' output is high), its Q output will go low at the next positive transition of the A' CLOCK. This will remove the high from the input of INVERTER 84 which in turn will enable 10 Recognize AND gate 72, and it will remove the high from the reset input of 10 COUNTED flip flop 74 through "OR" gate 76. The low Q output of START COUNT flip flop 64 is also applied to one input of "AND" gate 88, inhibiting it and thus preventing A CLOCK pulses from entering COUNTER 68.

It can be seen, therefore, that a VER GATE pulse of 9.5 A CLOCK cycles in duration has been generated in response to an EOL signal of short duration and that the circuit has returned itself to a condition whereby it is prepared to respond to the next EOL signal. The circuit is now in the same logic state heretofore described for that period following an EOF signal transition from a high to a low level, which defined a frame start, and preceding an EOL signal.

The response of the circuit will now be traced in response to the receipt of an EOL pulse of longer duration. There is no significance to the order in which the length of the duration of the EOL pulses is being described as regards the operation of the circuitry heretofore described. This system can respond to long or short EOL pulses without regard to order of occurrence.

In the event that the transceiver 10 is operating in a page-width, non-data, high-speed search mode, as signaled by an EOL signal of longer duration, the START COUNT flip flop 64 will operate as heretofore described, enabling "AND" gate 88 and allowing A CLOCK pulse to be counted in the COUNTER 68. When the COUNTER 68 reaches a count of 10, the 10 Recognize AND gate 72 will apply a high to the set input of 10 COUNTED flip flop 74 causing its Q output to go high.

Since the EOL pulse is of longer duration, a high is still being applied to INVERTER 82 which in turn is applying a low to one input of "AND" gate 86, disabling it. As a result, the high at the Q output of 10 COUNTED flip flop 74 has no effect on the "AND" gate 86 (i.e., no resetting action on START COUNT flip flop 64 which otherwise would, as heretofore described, terminate the VER GATE signal.)

However, the Q output of 10 COUNTED flip flop 74 is also applied to one input of "OR" gate 70 which, in turn, applies a high to the clear input of COUNTER 68, resetting all outputs of zero. The Q output of 10 COUNTED flip flop 74 is also applied to the J input of DISABLE flip flop 62. Thus, the Q output of DISABLE flip flop 62 will be set to a high at the next positive transition of the A' CLOCK. The high at the Q output of DISABLE flip flop 62 is applied to the input of "OR" gate 76 causing it to apply a high to the reset input of 10 COUNTED flip flop 74.

The set input of 10 COUNTED flip flop 74 is low because the outputs of COUNTER 68 are reset to lows, and because the output of INVERTER 94 is low, all of which cause the output of 10 Recognize "AND" gate 72 to be low. Hence, the Q output of 10 COUNTED flip flop 74 is reset to be low (Q' to a high), which, in turn, applies a low to the J input of DISABLE flip flop 62. Since the K input of DISABLE flip flop 62 is also at a low due to the low at the Q' output of START COUNT flip flop 64, DISABLE flip flop 62 is inhibited and will not respond to further positive transitions of the A' CLOCK. The Q output of the DISABLE flip flop 62 will remain high throughout the duration of the VER GATE signal, placing a disabling low signal at one input of 10 Recognize "AND" gate 72 via INVERTER 94, inhibiting it from responding to the outputs of COUNTER 68. Since the Q output of the 10 COUNTED flip flop 74 is also connected to one input of "OR" gate 70 and the other inputs of "OR" gate 70 are low, the clearing signal is removed from COUNTER 68. The START COUNT flip flop 64 has not been affected, and the VER GATE signal remains high.

COUNTER 68 resumes counting, starting at zero and continuing for 18 complete cycles of the A CLOCK, at which point 19 Recognize "AND" gate 78 will be enabled and will produce a momentary high output. This high is applied to "OR" gate 70 which in turn resets COUNTER 68. The output of 19 Recognize "AND" gate 78 is also applied to one input of "AND" gate 80, the other input of which is high via the Q' output of the 10 COUNTED flip flop 74.

The momentary high output of "AND" gate 80 is applied to one input of "OR" gate 66 which, in turn, applies a momentary high to the clear input of the START COUNT flip flop 64, resetting its Q output to a low, terminating the VER GATE signal.

The low Q output of the START COUNT flip flop 64 is applied to one input of "AND" gate 88 inhibiting its output and preventing A CLOCK pulses from entering COUNTER 68. The high Q' output of START COUNT flip flop 64 is applied to the K input of the DISABLE flip flop 62, enabling its Q output to be reset to a low at the next positive transition of the A' CLOCK. Upon being reset to a low, the Q output of the DISABLE flip flop 62 is applied to INVERTER 84 which applies a high to the 10 Recognize "AND" gate 72, enabling it. The low at the Q output of the DISABLE flip flop 62 is also applied to one input of "OR" gate 76, and since its other input, EOF, is also low, a low is applied to the reset input of the 10 COUNTED flip flop 74.

It can be seen that the VER GATE signal, generated in response to a long duration EOL signal, is 28.5 cycles of the A CLOCK in duration. The circuit has returned itself to a condition whereby it is prepared to respond to the next EOL signal. The circuit is in the same logic state heretofore described for that period following an EOF signal and preceding an EOL signal.

In the event that the transceiver 10 is operating in the receive mode, the logic circuitry of FIG. 4B performs a similar function to that heretofore described. However, rather than being initiated by an EOF signal, it is initiated by a DET'D EOF signal. Similarly, rather than an EOL signal, it receives a DET'D DLY'D SYNC signal as an input. Finally, rather than generating a VER GATE signal as an output, it generates a NEW VER GATE signal as an output.

The NEW VER GATE signal is either 9.5 or 28.5 cycles of the A CLOCK in duration, in response to the DET'D DLY'D SYNC signal that is of either a short or a long duration. The sequence of events that occurs within the logic circuitry is identical to that heretofore described for transmit mode. (One can make the above-mentioned substitutions into the previous description, and the result will be a description of receive mode operation.)

In review, it can be seen that the circuit heretofore described has generated VER GATE or NEW VER GATE signals which are 9.5 or 28.5 cycles of the precision A CLOCK in duration, in response to EOL or DET'D DLY'D SYNC pulses that were short or long, but not of precise duration. (See Table II.)

TABLE II

A CLOCK CYCLES COMPRISING VER GATE/NEW VER GATE SIGNALS

| | 9.5 A CLOCK CYCLES IN DURATION: |
|---|---|
| 0.5 cycles | Between start of VER GATE/NEW VER GATE and first count into COUNTER 30. |
| +9.0 cycles | 0 through 10 pulse count in COUNTER 30. |
| 9.5 cycles | Total A CLOCK cycles in VER GATE/NEW VER GATE signal of short duration. |
| | 28.5 A CLOCK CYCLES IN DURATION: |
| 0.5 cycles | Between start of VER GATE/NEW VER GATE and first count into COUNTER 30. |
| 9.0 cycles | 0 through 10 pulse count in COUNTER 30. |
| 1.0 cycles | Time during which COUNTER 30 is reset after 10 Recognize AND gate recognizes 10 count. |
| +18.0 cycles | Time between first new count of COUNTER 30 and 19 Recognize AND gate 50 recognizes 19 count. |
| 28.5 cycles | Total A CLOCK cycles in VER GATE/NEW VER GATE signal of long duration. |

The other command signal which must be generated by the Clock Synchronized Logic circuitry 12 of FIG. 1, is the SYNC signal. A circuit arrangement for generating such a SYNC signal is illustrated in FIG. 4B.

Consideration will be given to circuit conditions which exist prior to a frame start signal. The T line is high, indicating that the transceiver is operating as a transmitter and is applied to one input of each of the plurality of T "AND" gates 96, 98, 100, 102, 104 and enables each of them. The T signal is also applied to an INVERTER 106 which in turn applies a low and disables a plurality of R "AND" gates 108, 110, 112, 114. The output of INVERTER 106 is also applied to one input of an "OR" gate 116. Throughout the remainder of this description, the function of those logic elements which are used only in the receive mode (those elements shaded with vertical lines) will not be described except where it is necessary to show that they have no effect on circuit performance.

The EOF line is high, which through an INVERTER 118 applies a low to one input of an "AND" gate 120, causing its output to be low. The output of the "AND" gate 120 is applied to an INVERTER 122 which, in turn, applies a high to the clear input of a START SYNC flip flop 124, causing its Q output to be low and its Q' output to be high. The Q' output of START SYNC flip flop 124 is applied to the clear input of a TERMINATE SYNC flip flop 126, causing its Q' output to be high.

The high output of INVERTER 122 is also applied to the clear input of a SYNC START ENABLE flip flop 128, causing its Q output to be low. This low is applied to one input of one of the T "AND" gates 102 which, in turn, applies a low to one input of the "OR" gate 116. Since the other input of "OR" gate 116 is also low, the output will be low, applying a low to the J input of the START SYNC flip flop 124.

The VCO line is applying a VCO square wave signal to "AND" gate 104 which, in turn, through "OR" gate 130, applies the VCO square wave to an INVERTER 132. The INVERTER 132 applies an inverted VCO square wave, VCO', to the trigger input of the START SYNC flip flop 124. Since both the J and K inputs of the START SYNC flip flop 124 are low and its clear line is high, it is not affected by the VCO' square wave pulses. The EOL line is low and causes the T "AND" gate 96 to apply a low to one input of an "OR" gate 134, the other input of which is also low. The resulting low output of "OR" gate 134 is applied to the J input of the SYNC START ENABLE flip flop 128.

The B CLOCK is not running and therefore applies a low on the B CLOCK line to the Cp or trigger input of SYNC START ENABLE flip flop 128 and is also applied to the input of an INVERTER 136, which, in turn, is applying a high to one input of T AND gate 100. Since the T line is high, the output of T AND gate 100 will also be high, causing an "OR" gate 138 to apply a high to the CP or trigger input of the TERMINAL SYNC flip flop 126.

The VER GATE line is low causing the output of an INVERTER 140 to be high which in turn causes the output of the T "AND" gate 98 to be high (the other input of the "AND" gate 98, the T line, is high.) The output of an "OR" gate 142 is also high, applying a high to the J input of the TERMINATE SYNC flip flop 26.

The response of the circuit will now be traced from the initiation of a frame start command. Frame start is signaled by the high to low transition of the EOF line. The EOF line goes low and simultaneously the B CLOCK begins to run; i.e., the B CLOCK will go high one half B CLOCK cycle after a high to low transition of the EOF line. The low EOF line causes the output of INVERTER 118 to go high which enables the output of "AND" gate 120 to go high which in turn causes the output of INVERTER 122 to go low, removing the clearing signal from the START SYNC flip flop 124 and from the SYNC START ENABLE flip flop 128.

The removal of the clearing signal from these two flip flops will not affect their output states because the J and K inputs of SYNC START ENABLE flip flop 128 are both low, inhibiting it from responding to the B CLOCK pulses at its trigger input. Similarly, because the J and K inputs of START SYNC flip flop 124 are both low, it too, is inhibited from responding to the VCO' square wave at its trigger input.

In a previous section, the means by which a VER GATE signal is generated was described, and it will be recalled that VER GATE is initiated by EOL and the first high to low transition of the A CLOCK and that it will make a low-to-high transition, indicating the beginning of VER GATE, one cycle or less of the A CLOCK after EOL makes a low to high transition.

When the EOL line goes high, it causes the output of a T "AND" gate 96 to go high which, in turn, causes the output of the "OR" gate 134 to go high, applying a high to the J input of SYNC START ENABLE flip flop 128. The Q output of SYNC START ENABLE flip flop 128 will be set high by the next low-to-high transition of the B CLOCK and will in turn cause the output of "AND" gate 102 to go high. The high output of AND gate 102 will cause the output of "OR" gate 116 to go high, applying a high to the J input of the START SYNC flip flop 124.

The effect of the high enabling signal at the J input of the START SYNC flip flop 124 will allow the next low-to-high transition of the VCO' square wave (high-to-low transition of the VCO square wave) to cause the Q output of the START SYNC flip flop 124 to go high, thereby initiating a SYNC signal. The Q' output of the START SYNC flip flop 124 is low, thereby removing the resetting signal from the clear input of the TERMINATE SYNC flip flop 126.

VCO' square wave pulses continue to be applied to the CP or trigger input of the START SYNC flip flop 124, but are now inhibited from having an effect on its outputs since its K input is low. It should be noted here that the VER GATE line, as heretofore described, was high prior to the initiation of the SYNC signal causing a low on INVERTER 140 output, therefore a low at the output of "AND" gate 98 and "OR" gate 142, thus applying a low, disabling signal to the J input of the TERMINATE SYNC flip flop 126 for the duration of the VER GATE signal.

At the end of a short or long duration VER GATE pulse, depending upon whether the transmitter is in a scan mode or a page-width, non-data, high-speed search mode, the VER GATE Line returns low, causing the output of INVERTER 140 to go high, enabling the output of "AND" gate 98 to a high, enabling the output of "OR" gate 142 to a high, thus applying an enabling signal to the J input of the TERMINATE SYNC flip flop 126. The next positive transition of the B' CLOCK (negative transition of the B CLOCK) sets the TERMINATE SYNC flip flop 126 through "AND" gate 100 and "OR" gate 138, forcing the Q' output to a momentary low which provides a momentary disabling of the output of "AND" gate 120, forcing its output momentarily low.

The INVERTER 122 thus applies a momentary high to the clear input of the START SYNC flip flop 124, resetting it, forcing its Q output low, terminating the SYNC signal. The Q' output of the START SYNC flip flop 124 goes high, applying a resetting signal to the clear input of the TERMINATE SYNC flip flop 126, resetting Q' to a high. The momentary high output of INVERTER 122 is also applied to the clear input of SYNC START ENABLE flip flop 128 resetting its Q output to a low. This low is applied to one input of AND gate 102 which, in turn, applies a low to one input of the "OR" gate 116. Since its other input is also low, the output of OR gate 116 goes low, applying an inhibiting signal to the J input of the START SYNC flip flop 124.

Upon resetting of TERMINATE SYNC flip flop 126, its Q' output is high, thus a high is applied to one input of the "AND" gate 120, the other input of which is also high. Hence, the output of the "AND" gate 120 goes high which causes the output of INVERTER 122 to go low, removing the clearing signal from the START SYNC flip flop 124 and the SYNC START ENABLE flip flop 128. However, the removal of this clearing signal will not have any effects on the output of the START SYNC flip flop 124 nor the SYNC START ENABLE flip flop 128, because the J inputs of both are low. The Q' output of the START SYNC flip flop 124 remains high, maintaining the clear input of the TERMINATE SYNC flip flop 126 high, which prevents the TERMINATE SYNC flip flop 126 from responding to the B' CLOCK pulses at its trigger input and the high enabling signal at its J input.

It can be seen therefore that the logic circuitry of FIG. 4B has generated a SYNC pulse, the start of which is initiated by the presence of an EOL signal, and the termination of which is caused by the VER GATE signal. To be more precise, it can be seen that the SYNC signal is initiated by the first high to low transition of the VCO line that follows the first low to high transition of the B CLOCK which follows the beginning (low to high transition) of an EOL signal.

It can also be seen that the SYNC signal is terminated on the first high-to-low transition of the B CLOCK that follows the termination (high-to-low transition) of a VER GATE signal. It can further be seen that the termination of the SYNC pulse is synchronous with a precisely timed signal, the B CLOCK, and, additionally, that the logic circuit has returned itself to the same logic conditions that existed after a frame start, but before the receipt of an EOL signal, and is prepared to respond to the next EOL signal.

The logic circuit of FIG. 4B performs a similar function when the transceiver 10 is operating as a receiver. However, the output signal is called NEW SYNC. The response of the circuit will now be traced with the transceiver 10 operating in the receive (R) mode.

Consideration will be given to circuit conditions which exist prior to a frame start signal. The T line is low, indicating that the transceiver 10 is in the receive mode, disabling the T "AND" gates 96, 98, 100, 102, 104. The T line is also applied to the INVERTER 106 and causes its output to be high, enabling R "AND" gates 108, 110, 112, 114. The high output of INVERTER 106 is also applied to one input of the "OR" gate 116 which applies a high to the J input of the START SYNC flip flop 124. Throughout the remainder of this description, the function of those logic elements which are used only in the transmit mode (those elements shaded with horizontal lines) will not be described except where it is necessary to show that they have no effect on circuit performance.

The EOF line is held high by the DET'D EOF signal from the demodulator circuits and, as in the transmit mode, causes a reset action to occur. Hence, the Q output of the START SYNC flip flop 124 will be low, with Q' high, and the TERMINATE SYNC flip flop 126 will be inhibited due to the high at its clear input.

The DET'D DLY'D SYNC line is high, which causes the output of an INVERTER 152 to be low which in turn applies a low to one input of an R "AND" gate 114, forcing its output to be low. The low at the output of R "AND" gate 114 is applied to one input of the "OR" gate 130, the other input of which is also low. Thus, the output of the "OR" gate 130 is low which, in turn, causes the output of INVERTER 132 to be high, applying a high to the CP or trigger input of the START SYNC flip flop 124.

The low output of INVERTER 152 is also applied to one input of the R "AND" gate 110, causing its output to be low. Thus, the J input of the TERMINATE SYNC flip flop 126 is low. The B CLOCK is not running and is applying a low to one input of the R "AND" gate 112 which, in turn, applies a low to one input of "OR" gate 138. Since the other input of the "OR" gate 138 is low, its output will be low, applying a low to the CP or trigger input of the TERMINATE SYNC flip flop 126.

As was heretofore described, the DET'D DLY'D SYNC signal goes to a low just prior to the DET'D EOF signal, making a high to low transition, which, in turn, signals the receiver to respond to a transmitted frame start command. Upon going low, the DET'D DLY'D SYNC signal causes the output of INVERTER 152 to go high which will apply a high to the J input of the TERMINATE SYNC flip flop 126 through the R "AND" gate 110 and "OR" gate 142.

The high output of INVERTER 152 is also applied to the R "AND" gate 114 which applies a high input to INVERTER 132 through "OR" gate 130. INVERTER 132, in turn, applies a low to the CP or trigger input of START SYNC flip flop 124. The low on the DET'D DLY'D SYNC line is also applied to the J input of the SYNC START ENABLE flip flop 128 through an R "AND" gate 108 and "OR" gate 134. However, since T "AND" gate 102 is rendered inoperative in the receive mode, no further consideration of the condition of the SYNC START ENABLE flip flop 128 need be made.

DET'D EOF now makes a high to low transition, enabling the A CLOCK and the B CLOCK, as heretofore described, and is applied to the input of INVERTER 118, causing its output to go high, which in turn is applied to the input of "AND" gate 120. "AND" gate 120 is thus enabled, and its resulting high output is applied to INVERTER 122, causing its output to go low. This low is applied to the clear input of START SYNC flip flop 124, thus removing its resetting signal. However, since the trigger input of the START SYNC flip flop 124 is presently inactive (low), the outputs of the START SYNC flip flop 124 will not be affected. The high at the Q' output of START SYNC flip flop 124 is applied to the clear input of the TERMINATE SYNC flip flop 126, still rendering it inhibited.

At the end of a line scan, the DET'D DYL'D SYNC line goes high, applying a high to INVERTER 152, causing its output to go low, thus forcing one input of the R "AND" gate 114 to go low. This disables the output of R "AND" gate 114 which goes low, causing the output of "OR" gate 130 to go low, since its other input is held continuously low while the transceiver is operating as a receiver. The low output of "OR" gate 130 is applied to INVERTER 132, and the resulting low-to-high transition at its output is applied to the trigger input of the START SYNC flip flop 124 which sets its Q output to a high, thereby initiating a NEW SYNC signal. The Q' output of the START SYNC flip flop 124 goes low, removing the resetting signal from the clear input of the TERMINATE SYNC flip flop 126.

Since the low output of INVERTER 152 is also applied to one input of another R "AND" gate 110, it forces the output of that "AND" gate 110 to a low, which in turn is applied to one input of "OR" gate 142, and since its other input is held continuously low while the transceiver is operating as a receiver, the output of "OR" gate 142 goes low, applying an inhibiting signal to the J input of the TERMINATE SYNC flip flop 126. This action prevents the outputs of the TERMINATE SYNC flip flop 126 from responding to the removal of the inhibiting signal from its clear input (Q' output of START SYNC flip flop 124 is a low).

It is worthwhile to comment on the response of the logic circuit to the DET'D DLY'D SYNC signal. Note that in response to the DET'D DLY'D SYNC signal, it both removes the clear signal from the TERMINATE SYNC flip flop 126 and likewise disables its J input. It is therefore obvious to those skilled in the art that means must be implemented to insure that the clearing signal is removed from the clear input of the TERMINATE SYNC flip 126 only after the J input is disabled.

If the clearing signal is removed before the J input is disabled, any low-to-high transitions which might occur at the trigger input of TERMINATE SYNC flip flop 126 might cause its Q' output to be set to a low, causing an inadvertently early termination of the SYNC pulse. A safety factor is provided in this embodiment by employing the propagation delay of the logic elements to cause the clearing signal to arrive after the disabling signal.

The output of INVERTER 152 is the source for both the J input and clear input of the TERMINATE SYNC flip flop 126. To reach the J input it must pass through the R "AND" gate 110 and "OR" gate 142, or two propagation delays. To reach the clear input, it must pass through the R "AND" gate 114, "OR" gate 130, INVERTER 132, and START SYNC flip flop 124, for a total of at least four propagation delays. It is therefore obvious that the effects of the DET'D DLY'D SYNC signal are applied to the J input before they are applied to the clear input.

The NEW SYNC signal will remain high until the START SYNC flip flop 124 is reset by a signal from the TERMINATE SYNC flip flop 126. This process will now be described.

The B CLOCK is running and is applied to one input of the R "AND" gate 112 which in turn applies the B CLOCK to one input of "OR" gate 138, which, in turn, applies it to the trigger input of TERMINATE SYNC flip flop 126. The TERMINATE SYNC flip flop 126 does not respond to the B CLOCK because its J input is low.

When the DET'D DLY'D SYNC pulse goes low, the output of INVERTER 152 goes high which, in turn, applies a high to one input of the R "AND" gate 110 which applies a high to one input of "OR" gate 142 causing a high to be applied to the J input of the TERMINATE SYNC flip flop 126. At the next low-to-high transition of the B CLOCK, the TERMINATE SYNC flop flop 126 is set, resulting in a momentary low at its Q' output. The momentary low Q' output of the TERMINATE SYNC flip flop 126 is applied to one input of the "AND" gate 120 which, in turn, applies a momentary low to INVERTER 122, causing its output to go momentarily high.

The momentary high output of INVERTER 122 is applied to the clear input of START SYNC flip flop 124, causing its Q' output to go high and its Q output to go low, terminating the NEW SYNC signal. The high at the Q' output of START SYNC flip flop 124 is applied to the clear input of the TERMINATE SYNC flip flop 126, resetting it and causing its Q' output to go high. This high at the Q' output is applied to "AND" gate 120, enabling its output, and the resulting high is applied to INVERTER 122, causing its output to go low, removing the resetting signal from the clear input of the START SYNC flip flop 124.

The high at the output of INVERTER 152 is also applied to one input of the R "AND" gate 114 which in turn applies a high to one input of "OR" gate 130. "OR" gate 130 thus applies a high to INVERTER 132 which applies a low to the trigger input of the START SYNC flip flop 124.

The logic circuit has returned itself to the same logic conditions which existed after a frame start signal and prior to the receipt of a DET'D SLY'D SYNC signal.

In review it can be seen that the logic circuit of FIG. 4B, when operating in the receive mode, has generated a NEW SYNC signal in response to a DET'D DLY'D SYNC signal. It can be further seen that the start of the NEW SYNC signal is initiated by a low-to-high transition of the DET'D DLY'D SYNC signal and that the end of the NEW SYNC signal was caused by the first, low-to-high transition of the B CLOCK, following a high-to-low transition (or end) of the DET'D DLY'D SYNC signal. It can further be seen that an essentially nonsynchronous signal, DET'D DLY'D SYNC, has generated a NEW SYNC signal whose termination is precisely synchronized with a precisely timed signal, the B CLOCK. It can also be seen that the logic circuit of FIG. 4B can function as a receiver or a transmitter in response to the state of the T/R line.

Those skilled in the art will be able to substitute other, logically equivalent circuits to perform the control functions described heretofore, and it is well within the ability of the skilled logic designer to rearrange the circuits to utilize NAND gates, NOR gates, INVERTERS, and different flip flops, one-shots, and the like, to achieve the desired results.

Turning next to FIG. 5, there is shown a logic timing diagram, drawn to a common time scale, illustrating the various timing interrelationships among the clocks, the VCO and the control signals. The first horizontal line 200 represents the clock A. The second line 202 represents the quarter clock signal, B.

The transmitter VCO signal is illustrated at line 204 with frequency changes shown signalling the pre-SYNC 206 and post-SYNC 208 modulations described in the related patents and applications assigned to the present assignee. It will be seen that during the SYNC portion 210 of the VCO signal, the frequency of the VCO and the clock is substantially the same, although not necessarily in synchronism.

The transmitter EOL signal is shown at line 212. A Scan Mode EOL signal 214 lasts for 5.5 VCO cycles while a Search Mode EOL signal 216 extends for 16.5 VCO cycles.

The transmitter VER GATE signal is shown at line 218. A Scan Mode VER GATE signal 219 lasts for 9.5 cycles of clock A while a Search Mode VER GATE signal 220 lasts 28.5 cycles of clock A.

The transmitter SYNC signal is shown at line 222. A Scan Mode SYNC signal 224 is of a short duration while a Search Mode SYNC signal 226 is of a long duration.

Also shown, to assist in illustration, is the input to the transmitter counter 68 at line 228, the signal output of the 10 COUNTED flip flop 74 at line 230, the output of the SYNC START ENABLE flip flop 128 at line 232, and the output signals of the TERMINATE SYNC flip flop 126 at line 234.

Similarly, the comparable signals for the receiver are also shown. The only significant difference is that the Detected Delayed SYNC signal at line 236 is shortened by the 3 millisecond delay which is imposed to avoid any noise which might exist in the beginning of the transmitted signal. Accordingly, the Detected Delayed SYNC signal 238 is substantially shorter than the transmitter SYNC signal 224.

The receiver NEW VER GATE signal at line 240 extends for its full duration since it is controlled by the counter 68. The receiver NEW SYNC signal at line 242 has a duration comparable to the Detected Delayed SYNC signal 238 but is controlled by the quarter clock B, and, as a result, its duration tends to vary, but not significantly so.

An EOF End Of Frame signal is illustrated at line 244, as is the input to the receiver Counter 68 at line 246, the 10 COUNTED flip flop 74 input at line 248, and the TERMINATE SYNC flip flop 126 output signal at line 250.

It will be understood that these timing diagrams are illustrative only and, depending upon the circuits employed in the mechanization of the system, the various signals and their time relationship with each other might vary. It is, however, wholly within the scope of the invention to utilize any high frequency, precision oscillator in each transceiver as the fundamental reference and to use a much lower frequency clock signal, which is periodically reset, as the synchronizing signal to maintain the transmitter and receiver in synchronism during the transmission of video information representing the contents of a document.

Other modifications and improvements of the present invention will be apparent to those skilled in the art. Accordingly, the scope of the invention should be limited only by the claims appended hereto.

What is claimed as new is:

1. In a raster scan facsimile system utilizing transceivers having means for modulating and demodulating video information on a carrier signal and hving means for creating a raw first signal whose initiation indicates the end of a raster line and whose duration, determined by a predetermined number of cycles of a controllable oscillator, indicates the magnitude of vertical displacement between successive scan lines, successive raw first signals being asynchronous, a combination for better synchronizing a first transceiver functioning in a transmitting mode as a transmitter with a remote transceiver functioning in a receiving mode as a receiver comprising, in each transceiver:
   (a) precision oscillator means for creating a first clock signal whose frequency is an integral fraction of said precision oscillator frequency; and a second clock signal whose frequency is an integral fraction of said first clock signal; and
   (b) control signal generating means including counting means coupled in the transmitting mode to the controllable oscillator and to said precision oscillator means for generating control signals in response to the raw first signal, the initiation of said control signals being synchronized to said first and second clock signals and the duration of said control signals being related to said first signal, said counting means generating a first operating signal after counting a first predetermined number of first clock signals and a second operating signal after counting a second predetermined number of first clock signals for precise control of the duration of said operating signals; and (c) whereby the raw first signal is employed only to indicate the approximate start and duration of said control signals in a transceiver when functioning as a transmitter or a received signal when functioning as a receiver, and each scan of the image is controlled by said precision oscillator means for better synchronizing with remote transceivers so that uncertainties as to the time of termination or precise duration of a raw first signal do not affect the generation of control and operating signals.

2. The combination of claim 1 wherein said control signal generating means includes vertical incrementing means for generating a vertical gate signal of predetermined precise duration in response to the raw first signal and said operating signals, said vertical gate signal duration being fixed by said operating signal after a predetermined count of said counting means, corresponding to the predetermined number of cycles of the controllable oscillator employed in creating the raw first signal.

3. The combination of claim 2 further including:
detecting and delay means coupled when functioning as a receiver to receive the output of a remote transceiver functioning as a transmitter and operable in response to a received synchronizing signal for producing a detected delayed synchronizing signal;
wherein said control signal generating means in the receiving mode is coupled to said detecting and delay means and to said precision oscillator means for generating said vertical gate signal in response to said detected delayed synchronizing signal and said first clock signal, the duration of which is fixed by the duration of said operating signal after a predetermined count of said counting means.

4. The combination of claim 1 or claim 2 wherein said control signal generating means include:
horizontal scan control means for generating a flyback signal in response to a synchronizing signal, the initiation of which is controlled by the raw first signal and said second clock signal and whose duration is related to the duration of the raw first signal and said second clock signal;
whereby the horizontal scan of the transceiver is terminated and initated by reference to said precision oscillator means.

5. The combination of claim 4 further including:
detecting and delay means coupled to receive the output of a remote transceiver functioning as a receiver and operable in response to a received SYNC signal for producing a detected delayed SYNC signal wherein said control signal generating means alternatively applies to said vertical incrementing means and said horizontal scan control means an EOL signal or a detected delayed SYNC signal respectively corresponding to the transceiver operating as a transmitter or a receiver, and whereby said control signal generating means are operable in response to the provided one of the EOL and detected delayed SYNC signals.

6. The combination of claim 5, above, wherein horizontal scan control means includes means for generating a said flyback signal in response to said received detected delayed SYNC signal when operating as a receiver, the initiation of which is controlled by said received detected delayed SYNC signal, without reference to a clock signal.

7. In a raster scan facsimile system utilizing transceivers having means for modulating and demodulating video information on a carrier signal and having means for creating and transmitting an EOL based signal whose occurrence indicates the end of a raster line and whose duration, determined by a predetermined number of controllable oscillator means cycles, controls the size of the vertical scan increments, successive EOL signals being asynchronous, a combination for better synchronizing a first transceiver functioning as a transmitter with a second transceiver functioning as a receiver comprising, in each transceiver:
(a) precision oscillator means including means for deriving a first clock signal whose frequency is an integral fraction of said precision oscillator frequency; and a second clock signal whose frequency is an integral fraction of said first clock signal;
(b) counting means connected to said precision clock means for generating an operating signal after the predetermined number of first clock signals;
(c) vertical scan incrementing means coupled to the controllable oscillator and said counting means, and responsive to the EOL signal when operating as a transmitter and to a received detected delayed SYNC signal derived from a received EOL based signal when operating as a receiver and said first clock signal for producing a vertical gate signal whose duration is determined by said operating signal and is related to the duration of the EOL signal when operating as a transmitter, or to the duration of the detected delayed SYNC signal when operating as a receiver, and;
(d) horizontal scan control means coupled to the controllable oscillator and said precision clock means and responsive to the EOL signal when operating as a transmitter and to a received detected delayed SYNC signal when operating as a receiver and said second clock signal for synchronizing the start of horizontal sweep to said precision clock signal;
whereby each scan of the image is referred to said precision clock means for better synchronization with remote transceivers so that each vertical incrementing step and the start of each scan line are under coarse control of an EOL signal and under fine control of said precision clock means.

8. In a raster scan facsimile system utilizing transceivers having means for modulating and demodulating video information on a carrier signal and having means for creating an EOL signal having a first and second duration range whose initiation indicates the end of a scan line, and duration, determined by a first and second predetermined number of controllable oscillator means cycles, controls the magnitude of vertical displacement between successive scan lines, successive EOL signals being asynchronous, a combination for better synchronizing a first device functioning as a transmitter with a remote device functioning as a receiver, the receiver comprising:
precision oscillator means for producing a first clock signal whose frequency is an integral fraction of said precision oscillator frequency; and a second clock signal whose frequency is an integral fraction of said first clock signal;
detecting and delay means coupled to receive the output of a device functioning as a transmitter and operable in response to a received SYNC signal related to the EOL signal for producing a detected delayed SYNC signal having a duration range corresponding to the duration range of the received SYNC signal; and control signal generating means coupled to said detecting and delay means and to said precision clock means for generating a control signal whose initiation is synchronized to at least one of said first and second clock signals, and whose duration is selected by the duration range of said detected delayed SYNC signal, whereby each received scan of the image is referred to said precision oscillator for better synchronizing with the remote transmitting device so that uncertainties as to the precise time of termination and duration of the received SYNC signal do not affect the generation of control signals.

9. The combination of claim 8 wherein said control signal generating means including counting means for generating first and second operating signals in response to the first and second predetermined number of clock signals, respectively corresponding to the first and second duration range of received SYNC signals, said first control signal being a vertical gate signal of predetermined first or second duration roughly corresponding to the duration range of said received detected delayed SYNC signal and said first clock signal, said vertical gate signal having a duration being precisely fixed by said counting means.

10. The combination of claim 9, above, wherein said control signal generating means further include:

horizontal scan control means for terminating a flyback signal to start the horizontal sweep in response to said received detected delayed SYNC signal, the initiation of which flyback is controlled by said received detected delayed SYNC signal, the duration of which is related to the duration range of the detected delayed SYNC signal, and whose termination is controlled by said second clock signal;

whereby the horizontal sweep of the receiver is initiated by reference to said precision clock.

11. In a raster scan facsimile system transceiver capable of alternatively operating as a transmitter and as a receiver, including controllable oscillator means for communicating information between a transmitter and receiver, apparatus to improve synchronism between a transceiver functioning as a transmitter and remote transceivers functioning as receivers comprising, in combination:

(a) clocking means including precision oscillator means for creating a first clock signal whose frequency is an integral fraction of said precision oscillator frequency; and a second clock signal whose frequency is an integral fraction of said first clock signal;

(b) first signal generating means including means coupled to the controllable oscillator and operable in the transmitting mode to create a raw synchronizing signal (EOL), of a duration corresponding to a first or second predetermined number of controllable oscillator cycles; and (c) second signal generating means including means coupled to said first signal generating means, the controllable oscillator means and said clocking means and operable in the transmitting mode to create a precision synchronizing signal (SYNC) for transmission to remote transceivers operating as receivers whereby the transmitted synchronizing signal (SYNC) is initiated and terminated under the control of said clocking means.

12. The apparatus of claim 11, above further including vertical scan incrementing means including counting means coupled to said clocking means and said first signal generating means for producing a vertical spacing control signal (VER GATE) of a first and second duration corresponding respectively to a raw synchronizing signal (EOL) having a duration determined by the first predetermined number or the second predetermined number of controllable oscillator cycles, the initiation and termination of said vertical spacing control signal being controlled by said first clock signal and said counting means.

13. In a raster scan facsimile system transceiver capable of alternatively operating as a transmitter and as a receiver, including controllable oscillator means for communicating information between a transmitter and receiver, apparatus to improve synchronism between a transceiver functioning as a receiver and a remote transceiver functioning as a transmitter comprising, in combination:

(a) clocking means including precision oscillator means for creating a first clock signal whose frequency is an integral fraction of said precision oscillator frequency; and a second clock signal whose frequency is an integral fraction of said first clock signal;

(b) first signal generating means coupled to receiving circuits to receive a transmitted synchronizing signal (SYNC) for creating a raw synchronizing signal (DET'D SYNC), of a duration corresponding to a first or second predetermined number of controllable oscillator cycles at the transmitter;

(c) second signal generating means including delay means coupled to said first signal generating means for creating a delayed synchronizing signal (DET'D DLY'D SYNC); and (d) third signal generating means coupled to said second signal generating means and said clocking means for producing a precision synchronizing signal (NEW SYNC) in the transceiver operating as a receiver whereby the transmitter synchronizing signal (SYNC) controls the initiation of a precision synchronizing signal that is terminated under the control of said clocking means.

14. The apparatus of claim 13, above further including vertical scan incrementing means including counting means coupled to said clocking means and said second signal generating means for producing a vertical spacing control signal (NEW VER GATE) of a first and second duration corresponding respectively to said delayed synchronizing signal having a duration determined by the greater or lesser number of transmitter controllable oscillator cycles, the initiation and termination of said vertical spacing control signal being controlled by said first clock signal and said counting means.

* * * * *

UNITED STATES PATENT OFFICE
CERTIFICATE OF CORRECTION

Patent No. 4,290,085             Dated September 15, 1981

Inventor(s) Carl R. Kolker

It is certified that error appears in the above-identified patent and that said Letters Patent are hereby corrected as shown below:

Col. 2, line 32, change "information" to -- informational -- ;

Col. 3, line 7, after "Mhz" insert -- high -- ;

Col. 3, line 29, before "corresponding" change "the" to -- a -- ;

Col. 5, line 12, after "so that" change "the" to -- a -- ;

Col. 6, line 14, change "pagewidth" to -- page-width -- ;

Col. 11, line 7, after "is" insert -- at -- ;

Col. 18, line 37, change "TERMINAL" to -- TERMINATE -- ;

Col. 18, line 43, after "flop" change "26" to -- 126 -- ;

Col. 23, line 11, after "DET'D" change "SLY'D" to -- DLY'D -- ;

Col. 24, line 39, (Claim 1) change "hving" to -- having --

UNITED STATES PATENT AND TRADEMARK OFFICE
CERTIFICATE OF CORRECTION

PATENT NO. : 4,290,085

DATED : September 15, 1981

INVENTOR(S) : Carl R. Kolker

It is certified that error appears in the above-identified patent and that said Letters Patent is hereby corrected as shown below:

Col. 28, line 48, change "transmitter" to -- transmitted --.

Signed and Sealed this

Twenty-first Day of June 1983

[SEAL]

Attest:

DONALD J. QUIGG

Attesting Officer

Acting Commissioner of Patents and Trademarks